O. O. JONES.
ELECTRICAL SAFETY DEVICE.
APPLICATION FILED JAN. 12, 1918.
1,314,332.
Patented Aug. 26, 1919.
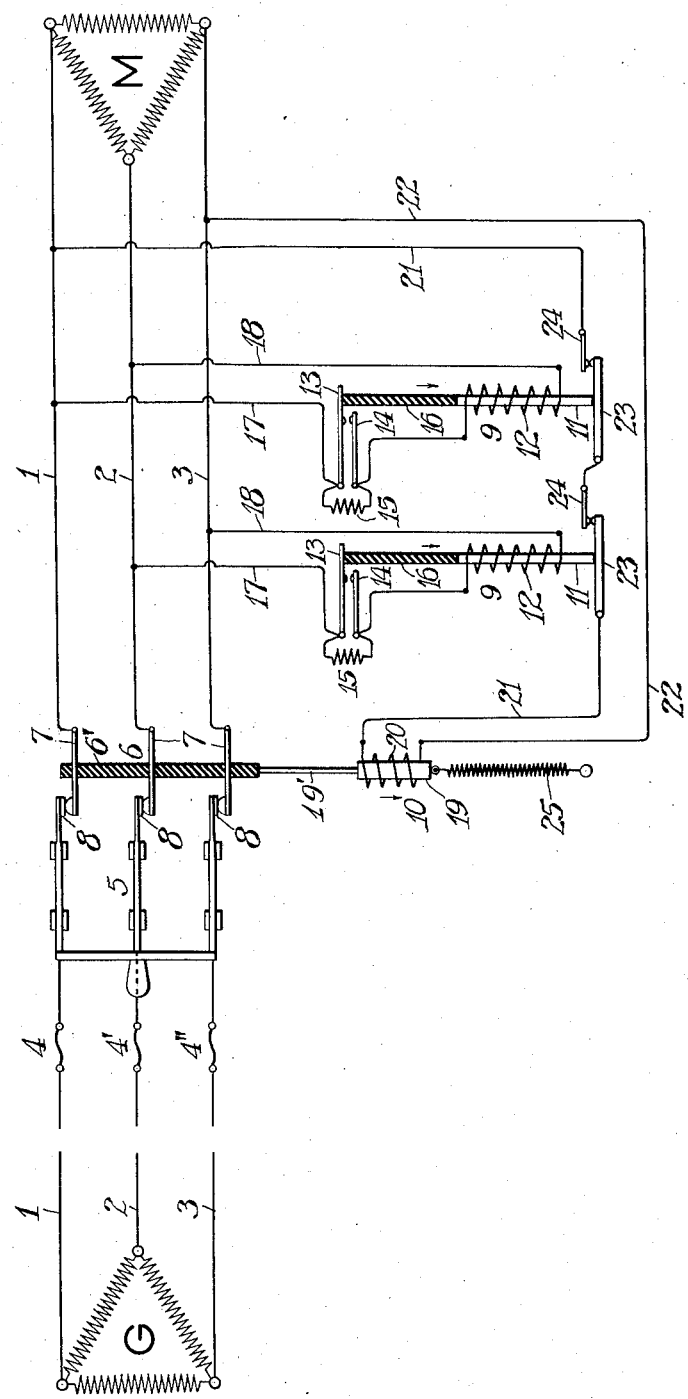

UNITED STATES PATENT OFFICE.

ORA OTIS JONES, OF CHICAGO, ILLINOIS, ASSIGNOR OF ONE-THIRD TO JOHN BURKHARDT AND ONE-THIRD TO AUGUSTUS G. DE CLERCQ, BOTH OF CHICAGO, ILLINOIS.

ELECTRICAL SAFETY DEVICE.

1,314,332.  Specification of Letters Patent.  Patented Aug. 26, 1919.

Application filed January 12, 1918. Serial No. 211,527.

*To all whom it may concern:*

Be it known that I, ORA OTIS JONES, a citizen of the United States of America, and a resident of Chicago, county of Cook, and State of Illinois, have invented certain new and useful Improvements in Electrical Safety Devices, of which the following is a specification.

This invention relates to electrical safety devices for alternating current power circuits and more particularly to safety coils for three phase motor circuits.

Heretofore circuit breakers have been inadequate under certain conditions to properly protect the apparatus included in the circuit. When for instance a three phase motor is run on a three phase circuit containing an ordinary circuit breaker, the motor may continue to run even though one of the three line fuses be blown, the power being supplied by the intact single phase remaining. The extra load usually blows one or the other of the two remaining fuses, due to the undesirable failure of the circuit breaker to operate. Whenever one of the three sides of the line circuit fails as suggested, by the blowing of a fuse, and the motor continues to run for a time, the voltage supplied by the motor to the two secondary phases is materially less than the normal voltage. Hence, in order to insure prompt response on the part of any protective device bridged across one of the phases, it must be responsive to those changes in voltage which are effected by such blowing of a fuse or other failure of the line. The circuit breaker may of course be combined with or constitute a part of a more elaborate piece of apparatus, as for instance a compensator, but this is immaterial, the essential feature so far as this invention is concerned being the circuit breaker and the means for controlling same.

The main objects of the invention are to provide means in connection with an alternating current circuit for operating the circuit breaker in case of a break in any phase or lead, or in case any fuse blows; to provide means responsive to slight change of potential, particularly across the line, for operating the circuit breaker; to provide a circuit breaker actuating member and control means therefor responsive to the opening of any branch of the line circuit of a three phase system; and to provide in connection with such apparatus means for economizing current consumed thereby under normal operating conditions.

An illustrative embodiment of this invention is shown in the accompanying drawing, which is a conventional circuit diagram showing how the safety coil is used in a three phase electrical system.

In the embodiment shown in the figure, the three-phase line circuit connecting the generator G and the motor M includes the main leads 1, 2, and 3. Each of said leads is provided with a main fuse 4, 4', and 4" respectively, and the circuit also includes a three-pole switch 5 and a circuit breaker 6. The said circuit breaker may be one of many different styles, but for the present purpose may be described as including a set of three movable contacts 7 and corresponding stationary contacts 8.

A pair of relay devices 9 are connected across two phases of the line circuit respectively, as for instance, between leads 1 and 2 and between leads 2 and 3. The circuit breaker 6 is provided with controlling means 10, subject in turn to the control of the two relays 9.

Each of said relays 9 comprises a pair of complementary members having relative movement and including a movable magnetic core 11 in the form of a plunger and a stationary energizing coil 12. Each of said relays is provided with a pair of relatively movable contacts 13 and 14 which are closed when the relay is not energized, said contacts serving to form a short circuit or shunt past a resistance member 15 which is thrown into series with the coil 12 when the relay is energized. The core 11 may be provided with an extension 16 of non-magnetic material arranged to coact with one of the springs 13 to lift same out of contact with the member 14 when the circuit is closed through the relay coil 12. Each of said relays is connected to the power circuit by a pair of leads 17 and 18.

The circuit for the relay is as follows: Extending from one of the line leads through the lead 17 to the contact 13, the circuit then continues through the resistance 15 to the contact 14, thence through the coil 12 to the lead 18 and thence back to the power circuit, it being understood that the coil 15 is shunted out or short circuited when the relay is deënergized and the contact 13 is released for coaction with the contact 14. Any equivalent form of relay may of course be used.

The circuit breaker controller 10 comprises a movable member preferably in the form of a plunger type magnet core 19 and an energizing coil or solenoid 20 therefor. The plunger 19 is connected operatively by the member 19' with the frame or bar 6' of the circuit breaker 6, so that movement of the member 19 actuates the circuit breaker, it being understood that the member 10 when deënergized tends to open the circuit breaker, but when energized tends to keep it closed.

The energizing coil 20 is connected by the leads 21 and 22 across one of the phases of the power circuit, as for instance, between the leads 1 and 3. Each of the relays 9 is provided with a switch comprising a movable member 23 and a stationary member 24, said switches being normally connected in series with the control circuit, being connected for instance in the lead 21, as illustrated in the drawing.

The relays 9 are adjustable either by varying the tension of the contact springs, or the amount of resistance 15, or the turns in the coils 12, as understood in the art, so as to release upon any predetermined reduction of electromotive force across the branches of the line circuit.

The operation of the device is as follows: The line is energized by closing the switch 5 and the circuit breaker 6. As soon as the line is energized, each of the relays 9 operates by pulling up its plunger magnet 11, thus cutting in its economy coil 15 and closing the switches 23—24. As soon as the relay switches are closed, the circuit breaker controlling coil 20 is energized and the plunger 19 is thereby held up against gravity, which if desired may be supplemented by a spring 25. The circuit breaker is thus normally held closed. The motor may then be started by duly manipulating its respective starter, not shown, which starter may be of the usual type and which constitutes no part of this invention, or a very small motor may be operated without a starter.

In case one of the line wires should become broken between generator G and controllers 9, or if one of the fuses should blow out, for instance in the lead 3, the corresponding relay (between leads 2 and 3) would be sufficiently deënergized by reason of its economy coil 15 and the drop in voltage to release its plunger core 11 enough to open the circuit at 24, thereby deënergizing the coil 20 and so releasing the core 19, which in falling serves to open the circuit breaker 6. If the power lead 1 should break, or the fuse therein should blow out, then the other relay (between leads 1 and 2) would release and in a similar manner serve to actuate the circuit breaker controller 10. In case the lead 2 should break, or the fuse therein should blow out, then either one or both of the relays would in the same manner be deënergized sufficiently to open the circuit 21—22, and so cause the controller 10 to open the circuit breaker.

The economy coils 15 are so called because after initial actuation of the device they prevent more current being supplied to coils 12 than normally necessary to retain the plungers 11. However, they do not interfere with the necessary initial full strength of the coils 12 for effecting closure of the switch 23.

For simplicity of illustration only the parts of the circuit breaker which are necessary to this invention are herein shown in conventional form, though it is to be understood that the circuit breaker may be provided with the usual overload and underload features.

Although the failure of one of the leads or one of the fuses of a three-phase power circuit is not necessarily alone sufficient to stop the motor, still there results a sufficient fluctuation or drop in voltage across the two adjacent phases to effect actuation of one or both of the relays 9 and consequent opening of the circuit breaker 6.

Although but one specific embodiment of this invention has been herein shown and described, it will be understood that numerous details of the construction shown may be altered or omitted without departing from the spirit of this invention as defined by the following claims.

I claim:

1. A three-phase system of the character described, comprising a generator, a motor, a three-phase circuit connecting same, a circuit breaker for automatically disconnecting said motor, and controlling means connected across one of the phases of said circuit adapted and arranged to operate the circuit breaker upon the opening of either of the leads of said one phase, said means having an automatic switch and current controlling resistance whereby its sensitiveness to voltage reduction is raised normally to a high degree.

2. A three-phase device, comprising a three-phase generator, a three-phase motor, an operating circuit connecting same, a circuit breaker in said circuit, a pair of relays connected across two of the phases of said circuit respectively for normal energization thereby, and a circuit breaker controller having an energizing coil connected across one of the phases of said circuit, the connecting circuit of said coil including a pair of switches connected in series and arranged for actuation by said relays respectively for opening said connecting circuit upon the opening of any lead of the said operating circuit back of said relays and controller and consequent relay deënergization.

3. A three-phase system of the character described, comprising a generator, a motor, a three-phase circuit connecting same, a circuit breaker for automatically disconnecting said motor, a relay connected across one of the phases of said circuit between the breaker and the motor, and circuit breaker releasing means connected and arranged for actuation by said relay for opening the motor circuit in case either branch of said one phase be opened.

4. A three-phase system of the character described, comprising a generator, a motor, a three-phase circuit connecting same, a circuit breaker for automatically disconnecting said motor, and controlling means connected across one of the phases of said circuit adapted and arranged to operate the circuit breaker upon the opening of either of the leads of said one phase, said controlling means including relatively movable magnetic and energizing members, current reducing means in series with the energizing member, and a switch operable in one direction by the movable member to short circuit said current reducing means, and in the opposite direction to throw said current reducing means from short circuited condition to series relation with said energizing member upon energization of said controlling means.

5. In a circuit of the character described, a three-phase motor control device adapted to cut out the motor upon failure of any phase, said device including an electromagnetic three-pole circuit breaker and a pair of coacting electromagnetic controllers for said breaker connected across different phases of the circuit, and each controller being self-adjustable for changing its electromagnetic effectiveness upon the establishment of running condition and having means for rendering it responsive to a diminution of pressure to substantially the secondary voltage of a motor having one line lead open, whereby the motor may be cut out upon failure of any line fuse or other line break.

Signed at Chicago this 8th day of January 1918.

ORA OTIS JONES.